United States Patent [19]
Hirashima

[11] Patent Number: 5,488,658
[45] Date of Patent: * Jan. 30, 1996

[54] VIDEO SIGNAL SCRAMBLING AND DESCRAMBLING APPARATUS

[75] Inventor: Masayoshi Hirashima, Ibaraki, Japan

[73] Assignee: Matsushita Electric Industrial Co., Ltd., Osaka, Japan

[*] Notice: The portion of the term of this patent subsequent to Oct. 11, 2011, has been disclaimed.

[21] Appl. No.: 228,220

[22] Filed: Apr. 15, 1994

[30] Foreign Application Priority Data

Apr. 15, 1993 [JP] Japan ................................. 5-113804

[51] Int. Cl.6 .............................. H04N 7/167; H04L 9/02
[52] U.S. Cl. ............................ 380/14; 380/10; 380/19; 380/20; 380/43; 380/46
[58] Field of Search ............................ 380/20, 14, 19, 380/21, 43, 46, 49, 50, 9, 10

[56] References Cited

U.S. PATENT DOCUMENTS

| | | | |
|---|---|---|---|
| 4,547,802 | 10/1985 | Fogarty et al. | 380/15 |
| 5,355,409 | 10/1994 | Hirashima | 380/14 |

FOREIGN PATENT DOCUMENTS

| | | |
|---|---|---|
| 0380181 | 8/1990 | European Pat. Off. . |
| 0464562 | 1/1992 | European Pat. Off. . |
| 0571753 | 12/1993 | European Pat. Off. . |
| 3927338 | 2/1991 | Germany . |

*Primary Examiner*—Bernarr E. Gregory
*Attorney, Agent, or Firm*—Ratner & Prestia

[57] ABSTRACT

A common circuit is used for scrambling and descrambling video signals. A memory stores key data. During scrambling the output of the memory is transmitted to a read address counter through an address generating circuit. Scrambling is effected by executing line rotation from a cut point descrambling is effected by the reverse of the aforementioned process.

23 Claims, 11 Drawing Sheets

VIDEO SIGNAL SCRAMBLING AND DESCRAMBLING APPARATUS

FIELD OF THE INVENTION

The present invention relates to a video signal encrypting apparatus for processing signals so that data contained in the signals may be maintained secret even if the signals are stored on a storage device or transmitted by satellite, wireless communication, or wired communication or recorded by a video camera, video tape recorder, or optical disk.

BACKGROUND OF THE INVENTION

Recently, as a result of advancements in various communication media such as communication satellites and recording media, it has become possible to transmit and communicate information over a wide area at high rates of speed. However, as a consequence, it has become easier to access the information and more difficult to keep transmitted information secret.

For example, information such as company communications which are transmitted by communication satellite and internal experimental data are often transmitted on a recording media such as video tape (VT) or optical disk.

The information transmitted in this manner is often in the form of pictures and sound which usually are confidential. This information is often protected by using a scramble encoder having a scrambling function. A conventional scrambling encoder, however, usually requires a large encrypting system and encoder. In addition, the encrypting process is complicated. As a result, an apparatus for recording and reproducing secret information which is encoded in, for example, a VTR is large and expensive.

FIG. 11 is a block diagram of a conventional scrambling encoder. The conventional scrambling encoder includes a computer 101 (CPU) for controlling the scrambling encoder. A variety of computers such as a personal computer or a general-purpose computer may be used for the CPU. In the conventional scrambling encoder, video signals and audio signals are applied to a video scrambler 102 and an audio scrambler 103, respectively. A key signal which is synchronized with the video signal is formed by a key signal forming circuit 104. The key signal is superimposed by a superimposing circuit 105 on the video signal scrambled by the video scrambler 102. The audio signal is frequency-modulated in an FM circuit 106 and mixed with the output of the superimposing circuit 105 in mixing circuit 107 to produce a scrambled composite video and audio signal.

The operation of the conventional scrambling encoder is described below. The video scrambler 102 uses line rotation processing for randomly exchanging the scanning lines of video signals to perform scrambling. The line processing uses a disconnection point of rotation for line rotation which is determined by CPU 101. For example, if the disconnection point is value X, the disconnection point X would be encoded by a key signal (kj). Then, the encoded value X would be formed into a binary signal within the vertical blanking period by the key signal forming circuit. Then, the audio signal is A/D converted and a pseudo-random number sequence pulse signal (PN signal) is added to encode and scramble the audio signal. The initial value of the PN signal is superimposed on the audio signal.

The scrambled signals are descrambled by a scrambling decoder. For example, to descramble the scrambled sound signal, the initial PN signal value is provided to the PN generating circuit. Then, a PN signal series for descrambling is generated, and the scrambled signal is demodulated using the PN signal series. The video signal is descrambled by using the PN signal initial value in every field or specific period to determine the read start position of video signal in the horizontal scanning period. The secrecy of the video and audio signal is maintained by not disclosing the algorithm for encoding the signals.

This conventional scrambling encoder and its corresponding decoder are large and expensive, and difficult to assemble into a television receiver, video tape recorder or video camera.

SUMMARY OF THE INVENTION

The present invention relates to an encrypting apparatus which is suited for home use by downsizing and integrating the scrambling encoder and its decoder.

The present invention further relates to a video signal encrypting apparatus for scrambling and descrambling video signals of a television signal. The apparatus includes a memory for holding key data for encrypting a pair of line memories which alternatively write horizontal scanning lines of an input video signal. A PN generator is also provided for setting the key data in the memory as an initial value for producing mutually different pseudo-random pulse signals for every horizontal scanning line. An address setting circuit is provided for setting a value corresponding to the output of the PN generator as an initial value when scrambling, and for setting a value as the output of the PN generator to be subtracted from the maximum address value of the line memory to determine an initial value when descrambling. Also included is an address counter for generating an address which is the next subsequent address to the address set by the address setting circuit, and for applying address signals alternately to the pair of line memories.

The present invention further relates to a video signal encrypting apparatus for scrambling and descrambling a video signal of a television signal. The apparatus includes a first nonvolatile memory for storing key data for encrypting and a second nonvolatile memory for storing a reloadable code number which includes a plurality of digits. A logic circuit is also provided for applying the outputs of the first and second nonvolatile memories. An input means is provided for entering the code number into the second memory. A pair of line memories are provided for writing the input video signals alternately for every horizontal scanning line. A PN generator uses the output of the logic circuit to set an initial value for producing mutually different pseudo-random pulse signals for every horizontal scanning line. Also included is an address setting circuit for setting a value corresponding to the output of the PN generator as an initial value when scrambling, and for setting a value as the output of the PN generator to be subtracted from the maximum address value of the line memory to determine an initial value when descrambling. Also included is an address counter for generating an address which is the next subsequent address to the address set by the address setting circuit and for applying address signals alternately to the pair of line memories.

The present invention further relates to a video signal encrypting apparatus further including an address setting circuit for setting a value equal to the output of the PN generator which is subtracted an output of the PN generator from the maximum address value of the line memory to set an initial value when scrambling, and as a value corresponding to the output of the PN generator which is used as an initial value to perform descrambling.

Accordingly, an apparatus relating to the present invention uses one scrambling codec to scramble and descramble. When scrambling, the PN generator issues mutually different pseudo-random pulse signals for every horizontal scanning line. The signal corresponding to the output of the PN generator is set as an initial address value in the address counter by the address setting circuit. The address counter is incremented up to a maximum address from the set address, and then from a minimum address up to one before the set address. The address counter then applies the address signals alternately to a pair of line memories to read the video signals alternately written in the pair of line memories. Accordingly, line rotation is performed. The video signal is scrambled by reading the horizontal scanning lines from the line memories by using a different starting position.

When descrambling, while the video signals are written alternately into the pair of line memories, a value corresponding to the output of the PN generator is subtracted from the maximum address value of the line memory set by the address setting circuit as an initial value for each horizontal scanning line. The address counter is incremented up to a maximum address from the set address, and then from a minimum address up to one before the set address. The address counter also applies the address signal alternately to the pair of line memories. The address counter also reads the video signal from the line memories to reproduce the original signal. Thus, scrambling and descrambling can be performed using the same apparatus.

The present invention further relates to storing the key data in the first memory and for storing the code number in the second memory. The code number is input by an input unit. Then a logic circuit produces from the data in the first and second memories a signal which is set as an initial value in the PN generator. Thus, a more advanced encrypting process is realized.

The present invention further relates to setting the address of the address setting circuit by subtracting the value of the output of the PN generator from the maximum address value of the line memory to set an initial value when scrambling. A value corresponding to the output of the PN generator is set as the initial value when descrambling.

DESCRIPTION OF THE PREFERRED EMBODIMENTS OF THE INVENTION

Figure 1:
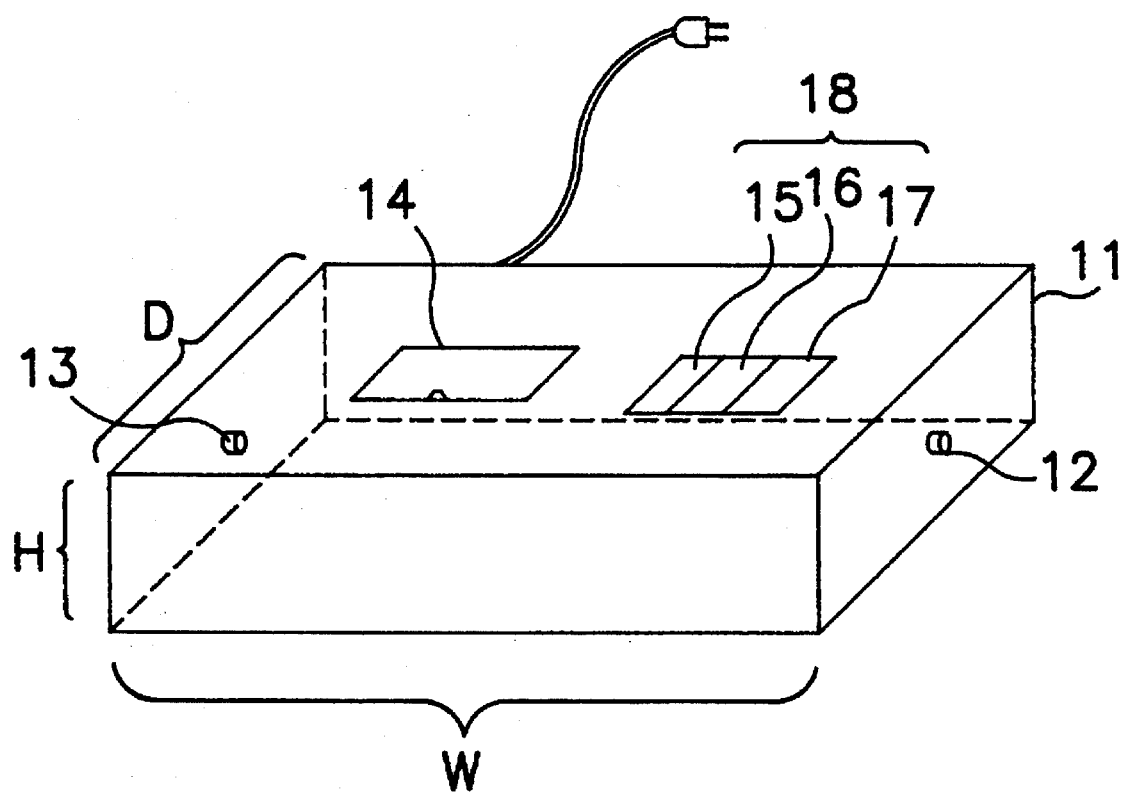
FIG. 1 is a perspective view showing the appearance of a video signal encrypting apparatus in accordance with a first exemplary embodiment of the present invention.

FIG. 1 is a perspective outline view of a video signal encrypting apparatus in accordance with an exemplary embodiment of the present invention. An input terminal 12 and an output terminal 13 are provided on a casing 11. The casing 11 also has a socket for attaching and detaching a read-only memory as discussed below. The socket is covered by lid 14. The casing 11 also includes operation switches 18 consisting of encoding start switch 15, decoding start switch 16, and stop switch 17.

Figure 2:
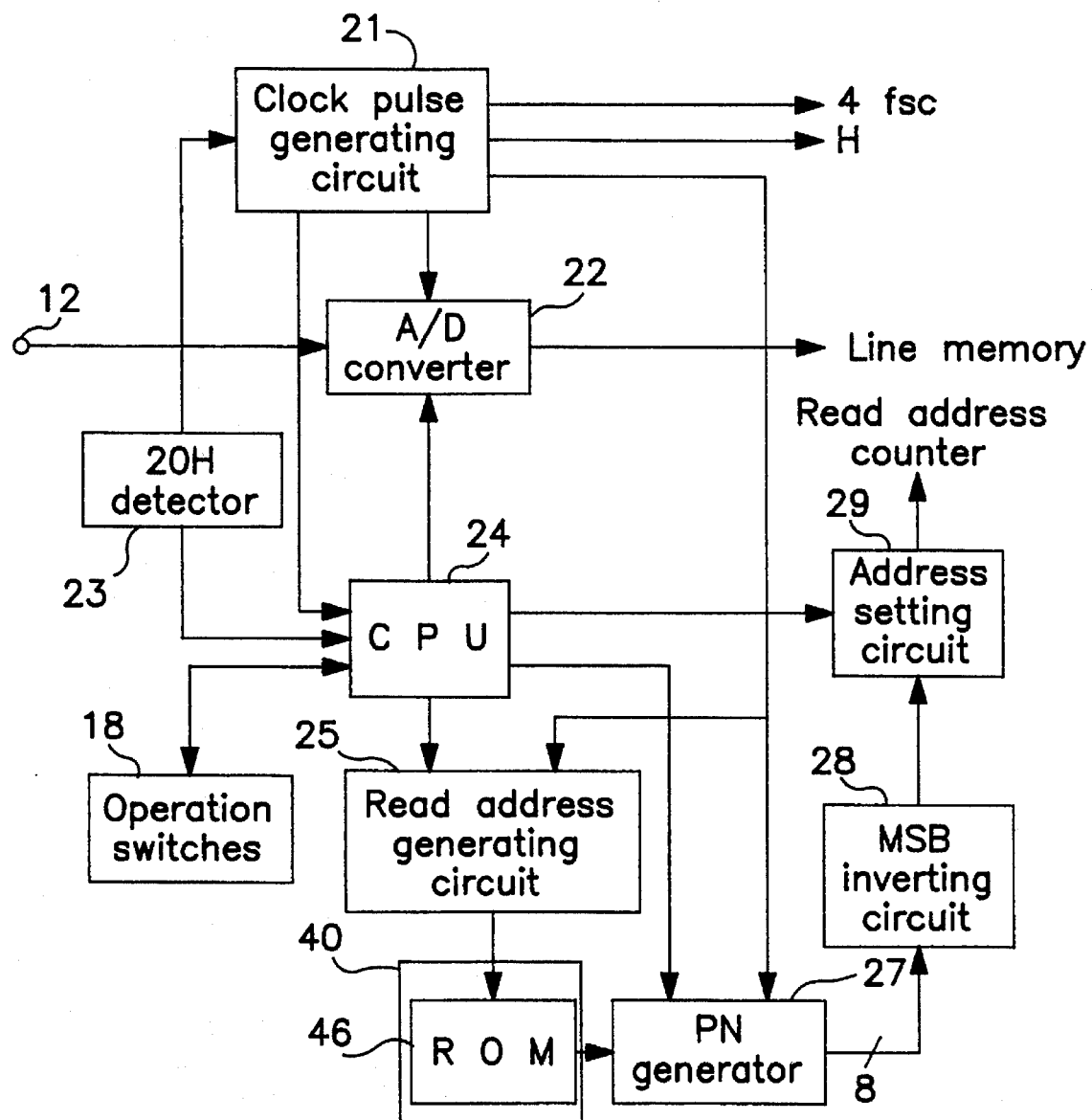
FIG. 2 is a block diagram showing the construction of video signal encrypting apparatus in accordance with a first exemplary embodiment of the present invention.
Figure 3:
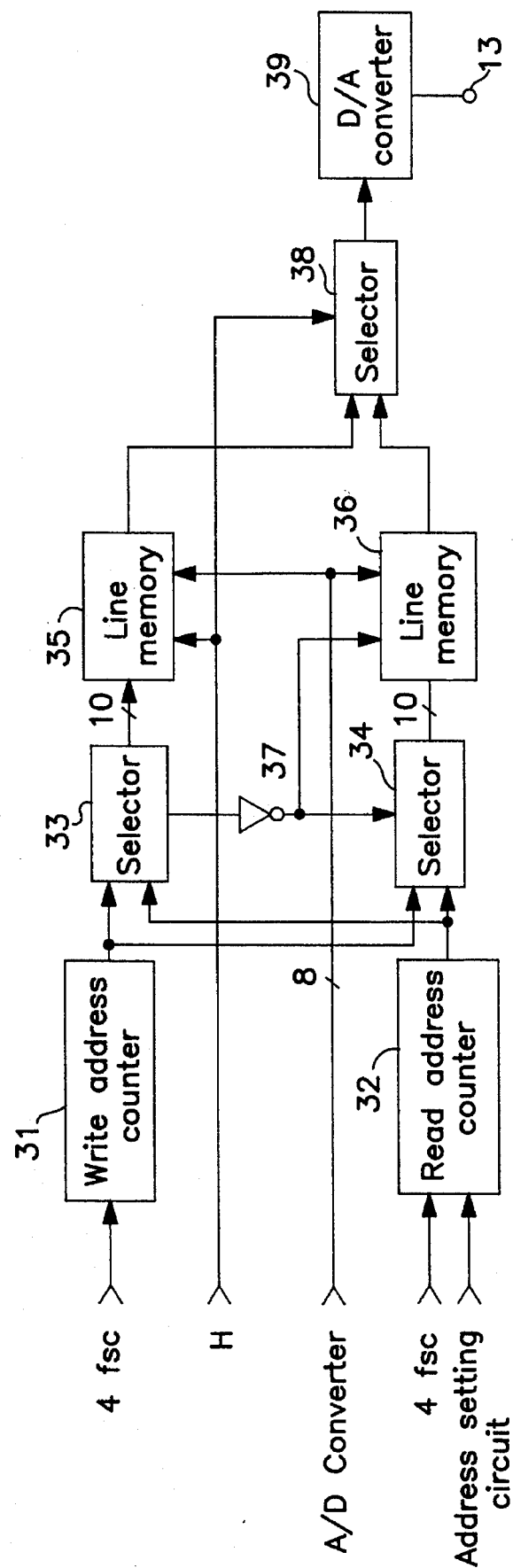
FIG. 3 is a block diagram showing the construction of portions for scrambling and descrambling of the video signal encrypting apparatus in a first exemplary embodiment of the present invention.

FIG. 2 and FIG. 3 are block diagrams showing the internal construction of the video signal encrypting apparatus according to the first exemplary embodiment of the present invention. In FIG. 2, an input terminal 12 is connected to a clock pulse forming circuit 21, and A/D converter 22, and a 20H detector 23. The clock pulse forming circuit 21 forms a signal 4 $f_{sc}$ by reproducing a color subcarrier ($f_{sc}$) using the horizontal sync signal H and vertical sync signal V of the signal input at input terminal 12. The clock pulse forming circuit also feeds a clock signal and a gate pulse to other parts of the apparatus as needed. The 20H detector 23 detects the video signal of the 20th horizontal scanning line (hereinafter called 20H), and if the brightness level of the 20H is entirely white level, then the 20H detector provides a detection signal to CPU 24.

CPU 24 is used for controlling the operation of the different units which comprise the video signal encrypting apparatus. Operation switches 18 are connected to CPU 24. CPU 24 provides a trigger signal to an A/D converter 22 when scrambling is started as well as providing necessary control signals to other units in the video signal encrypting apparatus. Also provided is a nonvolatile memory 26 which is connected through a read address generating circuit 25 to CPU 24. The nonvolatile memory 26 uses a read-only memory (ROM). The nonvolatile memory 26 is for storing key data which is desirably 64 or more bits, and for storing a read signal which is eventually provided to a PN generator 27.

The PN generator 27 includes a feedback shift register for generating a pseudo-random number sequence pulse signal (PN signal) of 16 bits. A predetermined 8 bits among the 16 bit output is provided to an MSB inverting circuit 28.

The output signal provided to PN generator 27 is used to determine a cut point of the horizontal scanning line. If there are 186 cut points in the one horizontal scanning line, the MSB exceeding 186 is inverted. .This is accomplished by MSB inverting circuit 28 which inverts the MSB of the output signal of the PN generator 27. The output signal n, where $0 \leq n \leq 185$, of the MSB inverting circuit is provided to address setting circuit 29. The address setting circuit 29 uses different methods to set an address. The first method is to calculate and set the initial value of a reading address for every horizontal scanning line. Accordingly, the initial value is 4n when scrambling. The initial value for descrambling is 744−4n. This assumes that the maximum value of the reading address is 744 or four times the number of cut points of 186. Alternatively, a second method sets the initial value equal to 744−4n when scrambling and 4n widen descrambling.

FIG. 3 is a block diagram showing another part of the video signal encrypting apparatus. A clock signal 4 $f_{sc}$ is provided to, a write address counter 31 and a read address counter 32 by the clock pulse forming circuit 21 shown in FIG. 2. Address counters 31, 32 are counters used for counting input clocks. Address counters 31, 32 provide parallel output to selectors 33 and 34, respectively. An A/D converter 22 converts the signals to digital signals and provides the digital signals to line memories 35, 36. The changeover signals (H) are provided by clock pulse forming circuit 21 to selector 33 and through inverter 37 to selector 34. The changeover signals provided to the selectors 33, 34 are mutually inverted. In this process, the write address counter 31 and the read address counter 32 are alternated. Changeover signals which are synchronized with the horizontal sync signal H, are provided to selectors 33 and 34. Subsequently, the changeover signals are provided to line memories 35 and 36. Line memories 35 and 36 are used for storing the video signals corresponding to one scanning line having 744 dots, in 8 bits. Data corresponding to one horizontal scan line is written into each line memories 35,36 at an address which is provided by write address counter 31 and selected by selectors 33, 34. The scan lines are alternately read out of the line memories 35,36 using the read address from the read address counter 32 which is selected by selectors 33, 34. Selector 38 selects the read signal from the line memories 35 and 36. Selector 38 is synchronized with selectors 33, 34. The output of the selector 38 is provided to D/A converter 39. D/A converter 39 converts the selected signal into an analog signal. The output of D/A converter 39 is connected to output terminal 13.

Memory 26, in FIG. 2, is an EPROM formed in package 40 so that it is detachable.

Figure 4:
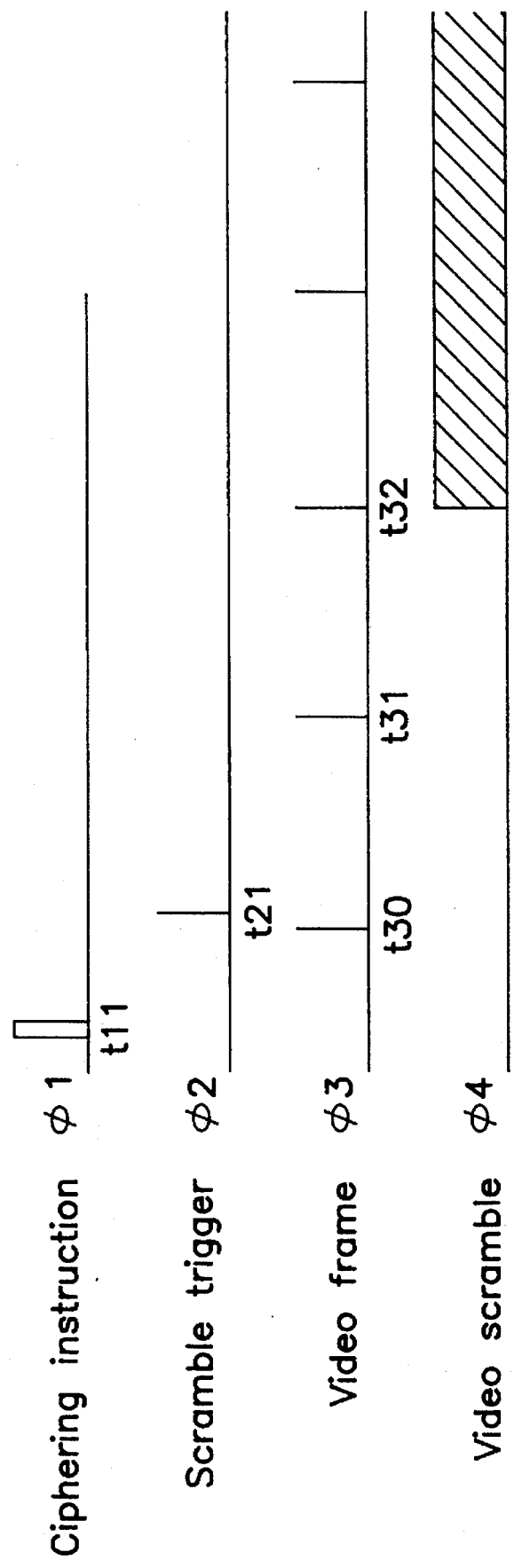
FIG. 4 is a timing chart showing the operation of the first exemplary embodiment of the present invention.

The operation of the exemplary embodiment is described below with reference to the timing chart shown in FIG. 4. As an example, a VTR is discussed below. First, to scramble the video signal entering the input terminal 12, the encoding start switch 15 is manipulated. As a result, the encoding instruction (ciphering) is terminated at time $t_{11}$ and a signal is sent to CPU 24. Then, CPU 24 sends a control signal to A/D converter 22, and generates a scramble trigger pulse. The A/D converter 22 performs A/D conversion in accordance with the clock pulse of the clock pulse forming circuit 21. At this time, the brightness level of the whole 20th horizontal scanning line is set to a white level and is used as a scramble trigger pulse. For example, if a scramble trigger signal is generated at time $t_{21}$ after the start video signal $t_{30}$, then encoding of the video signal starts at $t_{32}$ about 2 frames later than $t_{21}$, at $t_{32}$. This delay is occurs because time is required to prepare the decoding process for the encoded signal.

If the video signal is not scrambled, the video signal is converted into an 8-bit digital value in the A/D converter 22, and alternately written into one of the line memories 35 and 36 for every horizontal scanning line. The converted video signal is alternatively read out from the other line memory. In this case, later than one line, the signal is issued to the D/A converter 39 through the selector 38. In other words, an input signal of one H line is written in the memory, and the written one H line signal is read out from the memory and outputted to the D/A converter 39 so that the output signal delays one H line from the input signal.

The scrambling of the video signal by line rotation is explained below. The operation is started by adjusting the read address of the line memory to the cut point of the video signal. The cut point is the changeover position for line rotation which is also the changeover signals of the scanning line. The 8-bit output from the PN generator 27 is used as the cut point. The cut point is defined within the maximum of the maximum address 186 of the line memory as mentioned above. The MSB of the cut point is inverted by the MSB inverting circuit 28 if the cut point exceeds 186. The output of the MSB inverting circuit 28 is an 8-bit signal having an address value of 0 to 185. The value is different for every line.

For example, set the value equal to n. In the address setting circuit 29, 4n is preset until the end of the 22nd horizontal scanning line of the video signal supplied to the input terminal 12 (corresponding to the 21st horizontal scanning line in the output of D/A converter 39). This is when 4×n scrambling is performed. Thus, from the beginning of the 23rd horizontal scanning line, the 22nd horizontal scanning line provided by the D/A converter 39, of the video signal is fed into input terminal 12. The read address counter 32 counts 4n, 4n+1, 4n+2, . . . , 744, 0, 1, 2, 3, . . . 4n−1. Accordingly, as shown in the "original signal (23H) $\phi 0$" in FIG. 5, the data $a_0$ to $a_9$ of one horizontal scanning line is written in line memory 35 and read out of line memory 35 as $a_4$, $a_5$, . . . , $a_9$, $a_0$, $a_1$, $a_2$, $a_3$. Thus, a scrambling signal such as shown as $\phi 1$ in FIG. 5 may be obtained. The 24th horizontal scanning line read during this period is directly written into the line memory 36. When the 24th horizontal scanning line is to be read from line memory 35 after scrambling of the 23rd horizontal scanning line, the read start address set in the read address counter 32 is shifted by a specified number of bits, and changed from n to k. The number of bits by which the shift register is shifted often for scrambling the horizontal scanning line is preliminarily determined at the time of system design.

Figure 5:
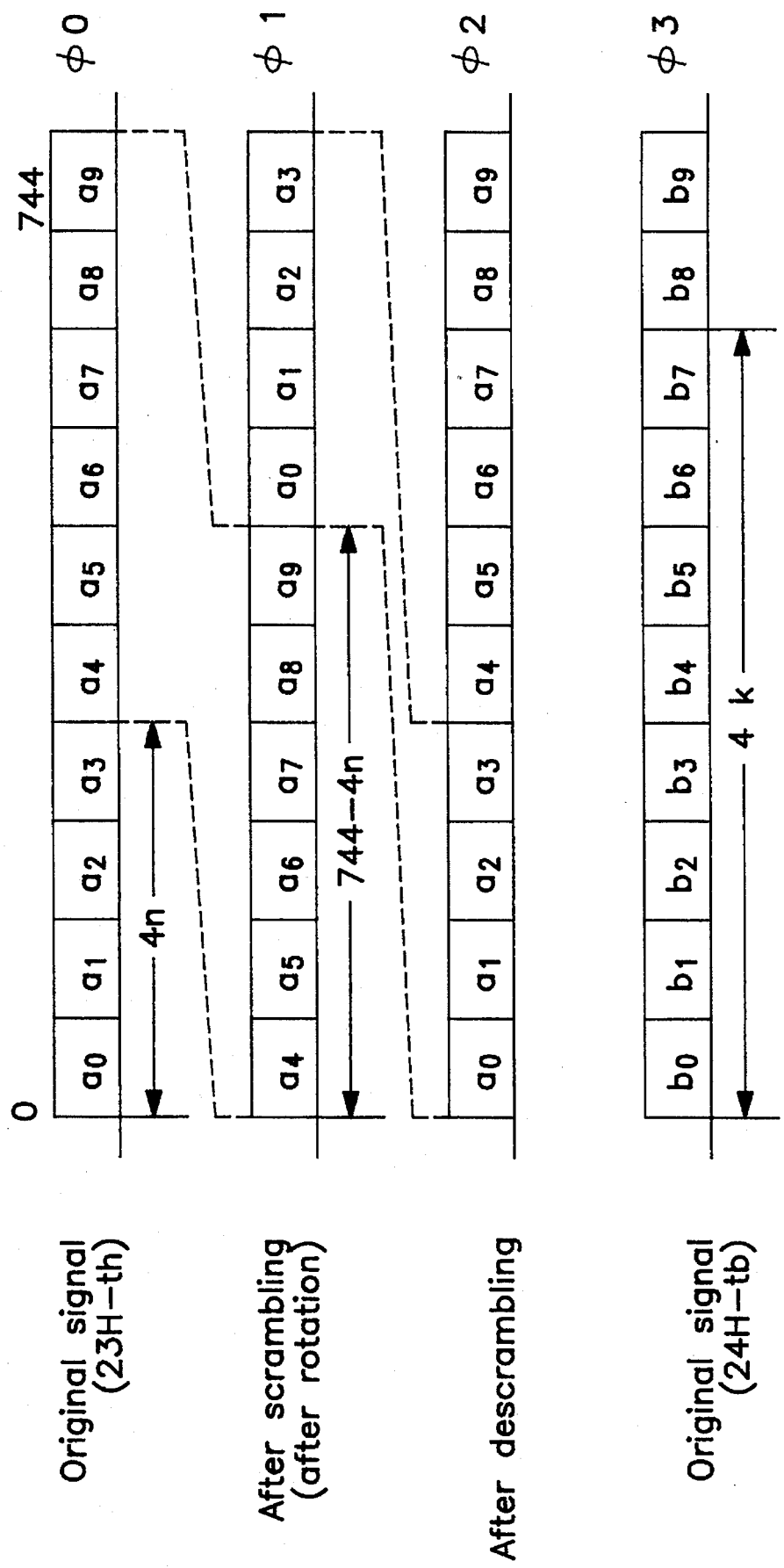
FIG. 5 is a diagram showing an example of the signal configuration change of the horizontal scanning lines according to a first exemplary method of the present invention for scrambling and descrambling.

While the 25th horizontal scanning lines is being fed into the line memory 35 through input terminal 12, the data of line memory 36 corresponding to the 24th horizontal scanning line is read out. At this time, the output of the read address counter 32 counts up from 4k to 4k+1 as shown in FIG. 5. This process is also performed when reading the 23rd horizontal scanning line from line memory 35. Therefore, line rotation is applied with 4k as the cut point. Thus, video signals from scanning line 234 to scanning line 236H of the field starting at $t_{32}$ in FIG. 4 are scrambled by rotation processing for each horizontal scanning line unit. Accordingly, a user records and reproduces scrambled video signals, therefore protecting the encoded video signals from others. By using a detachable memory 26 for storing the key data it is possible to prevent the original picture from being reproduced unless the same memory 26 (or a duplicate thereof) as the one used at the time of recording is inserted into the apparatus.

The second method is described below with reference to FIG. 6. When the 22nd horizontal scanning line is supplied to input terminal 12 (corresponding to the 21st horizontal scanning line output of the D/A converter 39), the read address counter 32 is preset at 744−4n. The read address counter 32 counts up, 744−4n+1, 744−4n+2, . . . , 744−4n+

4n, 0, 1, 2, 3, ..., 744–4n–1. As a result, as shown in "original signal 23(h) $\phi_{10}$" in FIG. 6, data $a_0$ to $a_9$ of the 23rd horizontal scanning line of 23H is written in the line memory 35 and read from line memory 35 as $a_4$, $a_5$, ..., $a_9$, $a_0$, $a_1$, $a_2$, $a_3$, as shown on line $\phi_{11}$ of FIG. 6.

Figure 6:
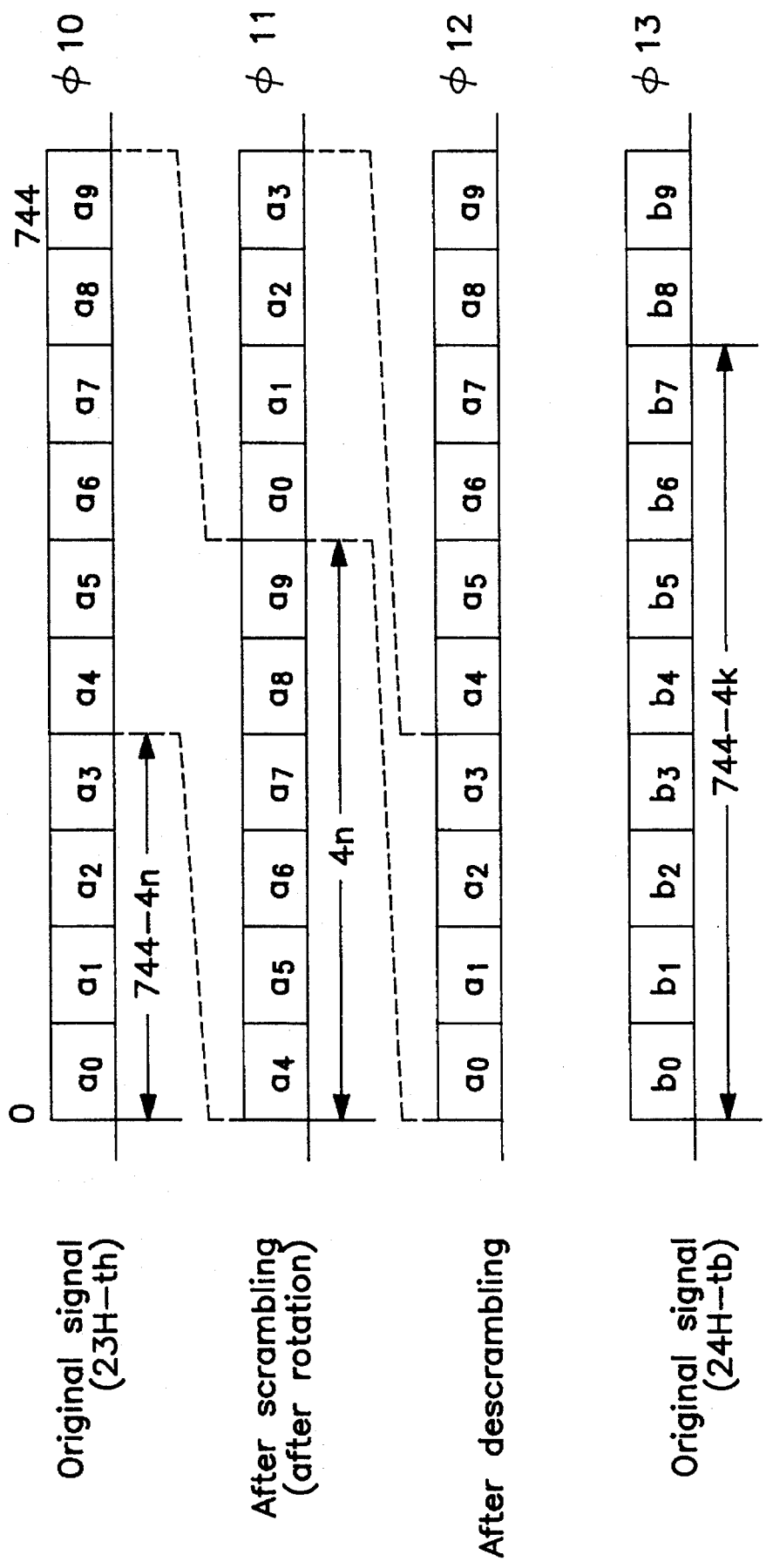
FIG. 6 is a diagram showing an example of signal configuration change of the horizontal scanning lines according to a second exemplary method of the present invention for scrambling and descrambling.

When the signal corresponding to the 24th horizontal scanning line is entered in this reading period it is written into line memory 36 as shown on line $\phi_{13}$ in FIG. 6. When the 24th horizontal scanning line is to be read out, the read start address, set in the read address counter 32, is changed to a value k from the value n. Accordingly, the bits will be shifted by 744–4k. Therefore, the output of the read address counter 32 counts up from 744–4k. 744–4k+1, ... as shown in FIG. 6. In this way, the 24th scanning line is read out as $b_8$, $b_9$, $b_0$, ..., $b_7$ from the line memory 36 in a manner similar to the reading of the 23rd horizontal scanning line. The cut point for rotation applied is 744–4k.

In addition, the CPU 24 sets or changes the value of the read address generating circuit 25, for example, once in every field or once in every horizontal scanning line. This procedure is predetermined.

As mentioned before, scramble trigger signal (white level 20H) is generated once after key input of switch 15. That is, white level 20H, which is also used for the trigger of descramble, exists only at the beginning of the scrambled signal. If the scrambled signal is reproduced from the middle portion of the scrambled signal, white level 20H does not appear, thus making descrambling impossible.

Accordingly, it is desired to generate a scramble trigger signal at a specified period interval to superimpose the scrambled signal on the video signal. For example, scramble trigger signal may be generated in every minute, similarly to the repetitive time interval of the pseudo-random signal. Descramble can start by the scramble trigger signal.

It is important that the 8 bit output of the PN generator 27 are used as the cut point for scrambling in the line rotation method. It is also important that the cut point is defined within the maximum of the maximum address, which is 186, of the line memory. Accordingly, the relationship between n and k for determining the cut point during one horizontal line scanning period of the video signal is nonlinear, and therefore cannot be predicted. Specifically, the read start address set by the read address counter 32 is shifted by specified bits in every horizontal scanning line, and changed to another numeral k instead of n. The number of bits used to shift the shift register in a horizontal line scanning period is determined preliminarily at the time of system design. Thus, even is n if known, k may not be known. Therefore, by ciphering the cut point of rotation, secret processing of a video signal may be realized.

Next, the operation of reading the scrambled signal and descrambled signal according to the first method for a VTR or video disk is described below. First, the reproduced scrambled video signal is fed into input terminal 12. As a result, a period of the 20th scanning line is detected by the 20H detector 23 when the video signal is all white level. The detected period is transmitted to CPU 24. CPU 24 sets the address setting circuit 29 to a descrambling state when the period is detected.

In order to return "$\phi_1$ after scrambling" into "$\phi_2$ after descrambling" as shown in FIG. 5, it is necessary to set the read address counter 32 to an initial state of (744–4n) according to the output of PN generator 27 which is n. Accordingly, the address setting circuit 29 operates 744–4n when descrambling. The address setting circuit 29 presets 744–4n in the read address counter 32 as a read address. As a result, as in line $\phi2$ shown in FIG. 5, the 23rd horizontal scanning line starts from $a_0$, that is, $a_0$, ..., $a_3$, $a_4$, ..., $a_9$, and is sequentially read out to produce data as shown in line $\phi0$. In this period, the rotated 24th horizontal scanning line signal is recorded in line memory 36 by sequentially reading from $b_0$ to $b_1$, ... while using 744–4k as the initial starting point to read. Accordingly, it is possible to descramble the video signal. During this process, the write address counter 31 is set to write the input directly into line memory 35 or 36 for every horizontal scanning line. Therefore, special processing is not necessary for descrambling.

When the second method is used, it is desirable to set the read address counter 32 initially to 4n because n is output by PN generator 27. This is done to return line $\phi_{11}$ after scrambling into $\phi_{12}$ after descrambling as shown in FIG. 6. The address setting circuit 29 presets 4n into the read address counter 32 when descrambling. As a result, as shown on line "$\phi_{12}$ after descrambling" in FIG. 6, the 23rd horizontal scanning line is sequentially read out in a state which is similar to that shown in $\phi_{10}$. In this period, since the rotated 24th horizontal scanning line is recorded in line memory 36, it is possible to descramble by reading out from 4K sequentially to produce $b_0$, $b_1$, ... when starting to read the 24th horizontal scanning line.

The video signal having each horizontal scanning line read using this process is selected by selector 38 and provided to D/A converter 39, where it is converted into an analog video signal. Thus, a descrambled video signal is produced from the output terminal 13.

As specifically described above, most of the circuits shown in FIGS. 2 and 3 are digital signal processing circuits, which can be easily formed on a LSI chip. The number of gates, except switches 18 (15 to 17), clock pulse forming circuit 21, A/D converter 22, and D/A converter 39, are approximately 20,000 to 30,000 gates. These gates may be integrated on one chip. The clock pulse forming circuit 21 and 20H detecting circuit 23 may be constructed by altering circuits which have a similar function and which are used in a character broadcast receiver.

Figure 7:
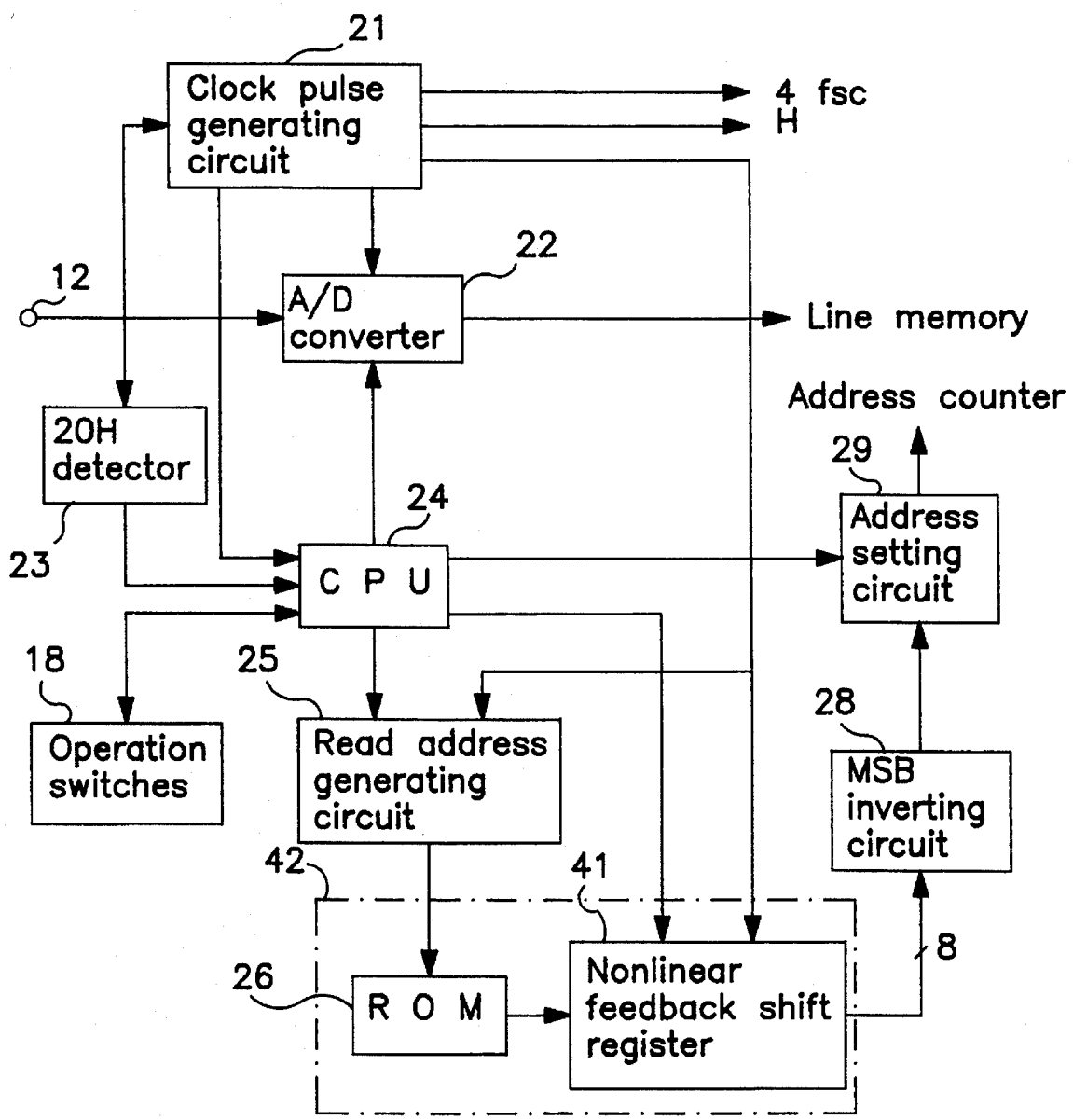
FIG. 7 is a block diagram showing the construction of a video signal encrypting apparatus in accordance with a second exemplary embodiment of the present invention.
Figure 8A:
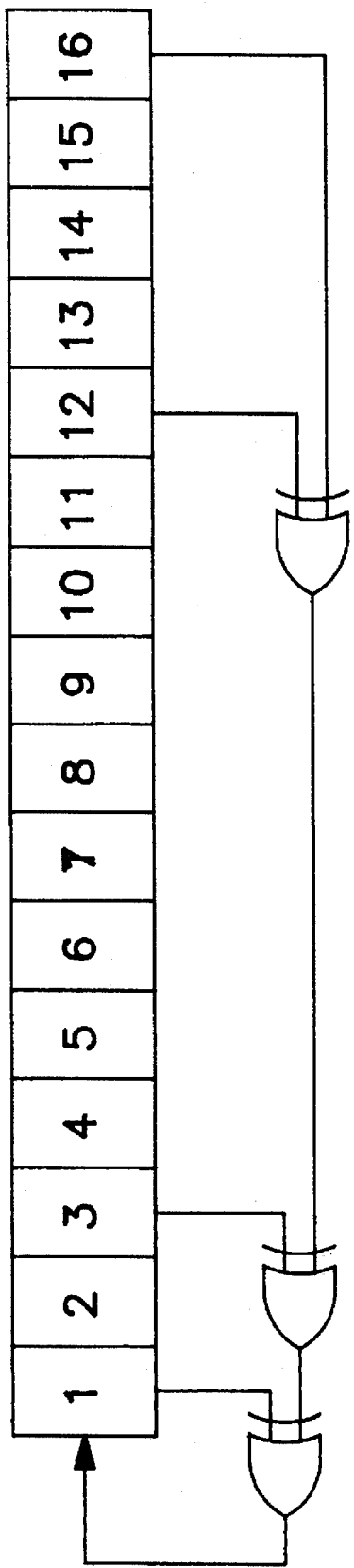
FIGS. 8a and 8b are block diagrams showing two different examples of nonlinear shift registers of the second exemplary embodiment.
Figure 8B:
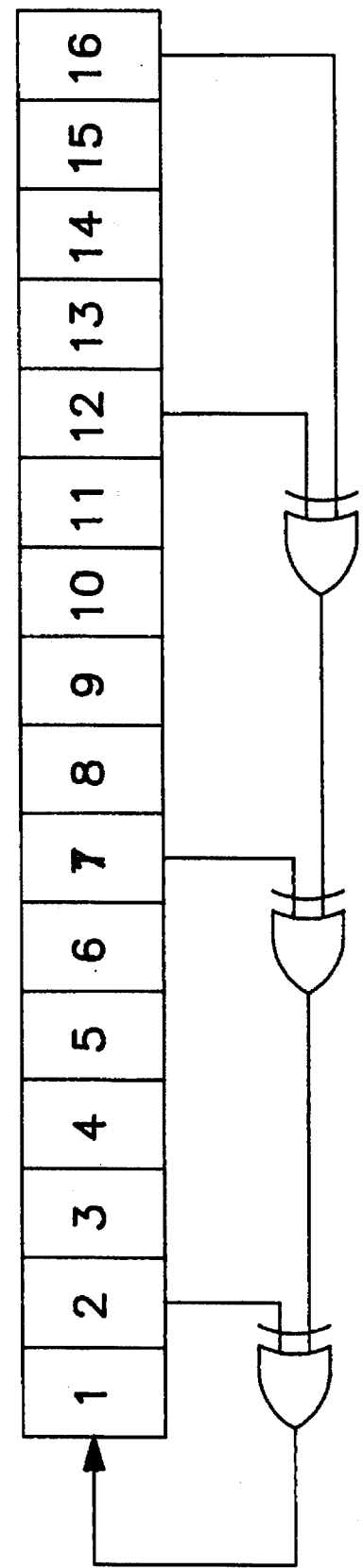

Below, a second exemplary embodiment of the present invention is described. FIG. 7 is a block diagram showing the second exemplary embodiment which includes units which correspond to those shown in FIG. 2 of the first exemplary embodiment. The corresponding units to the previous figures are identical and hence, explanations of their functions are omitted. In the second embodiment, as shown in FIG. 7, a nonlinear feedback shift register 41 is used instead of the PN generator 27. The nonlinear feedback shift register is contained in a package unit 42 together with memory 26 for storing the key data. An example of the linear feedback shift register is shown in FIG. 8. It is known that there are at least ten different methods of implementing a 16-stage linear M series wiring system as shown in "Latest Spectrum Diffusion Communication System, pp. 88–90, JATECH, 1978" which is incorporated herein by reference. FIG. 8 is a circuit diagram showing two different examples of the linear feedback shift register. Herein, the shift register shown in FIG. 8 is composed of a field programmable gate array. The shift registers differ in the number of stages by one stage each. Each package can be set very easily when manufacturing. By selecting (1) the number of stages of the shift from 49 types which range from 16 to 64, and (2) the feedback loops, it is possible to obtain shift register and feedback loop combinations of about 500 types. Further, if the combinations of the 64-bit key data of the memory 26 are taken into account, it would be very difficult to copy package 42 unless package 42 is obtained and disassembled. Thus, the safety against tapping and illegal deciphering is heightened as compared to the first exemplary embodiment.

The scrambling and descrambling operation of the second exemplary embodiment is the same as the first exemplary embodiment.

Figure 9:
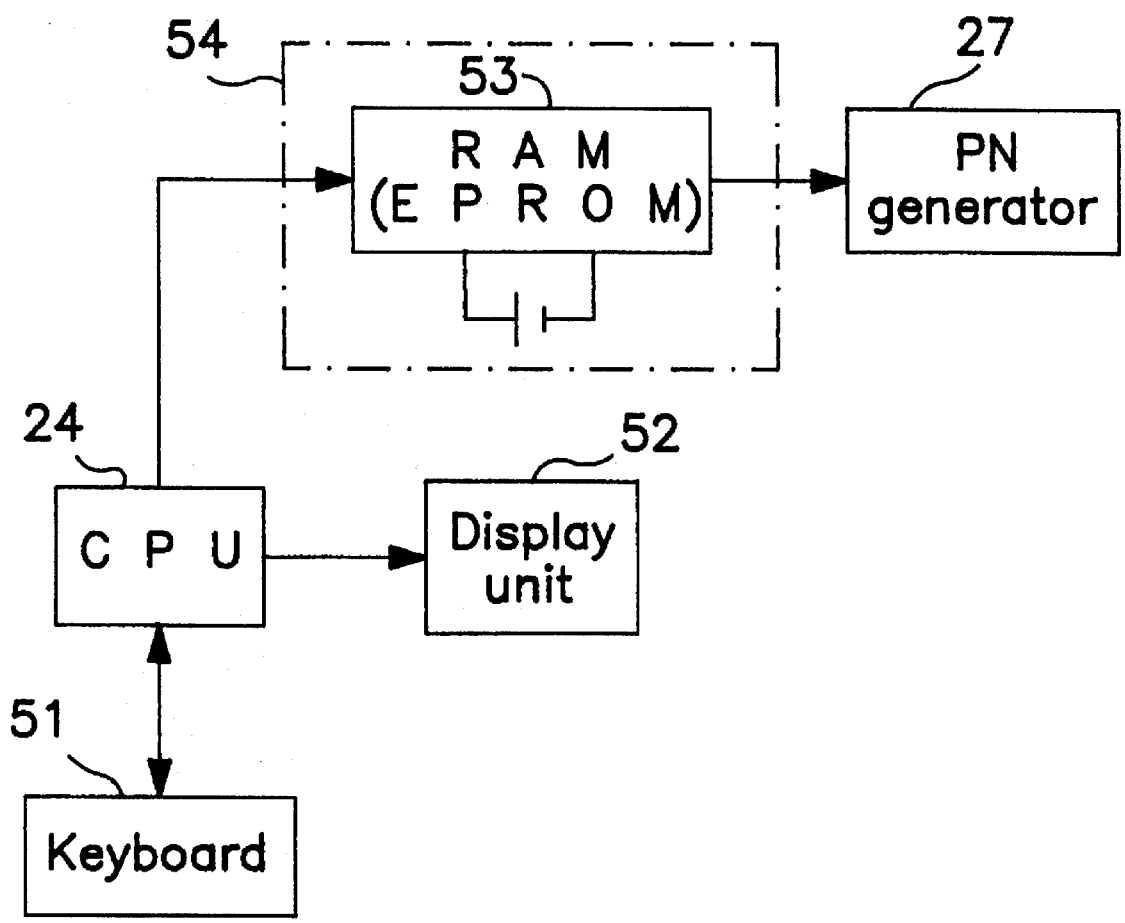
FIG. 9 is a block diagram showing a third exemplary embodiment of the present invention.

A third exemplary embodiment is described below. FIG. 9 shows the principal parts of the third exemplary embodiment. Instead of using switches 15 to 17 as in the first embodiment, a keyboard 51 is used. Keyboard 51 is connected to CPU 24. The keyboard comprises *, # keys and numeric keys For example, the * key is used as an input to start ciphering and end deciphering. The # key is used to start deciphering and end ciphering at the same time. Keyboard 51 is, for example, used for entering a four-digit code number. The input code number could, for example, be displayed on display unit 52. The input code number would also be provided to PN generator 27 through memory 53. Memory 53 may be random access memory (RAM), or an erasable programmable ROM (EPROM). Suppose, for example, the four-digit code number entered from numeric keypad of the keyboard 51 is a Binary Coded Decimal (BCD) code which is a numeric string of 0 to 1 of 16 bits. The code is used as the key data in this embodiment. This data is used as the initial value of the PN generator 27. The remaining portions of the third exemplary embodiment operate in a similar manner as the first embodiment. The code number is written once into the memory 53. When memory 53 is a RAM, a battery may be used to back up the RAM. It could be possible to enter the code number every time the apparatus is used even if there is no battery backup. Alternatively, the RAM may be detachable and located in package 54. However, the data of code number would be lost when disconnected from the main body if the detachable package did not have a battery backup.

In this embodiment, since the code number comprises four digits which are random inputs of four-digit numerals, it would be possible to decipher the code by using of approximately 10,000 combinations. To prevent this, as in the second embodiment, the PN generator 27 is selected from 500 types of nonlinear feedback shift registers, which help prevent illegal deciphering.

Figure 10:
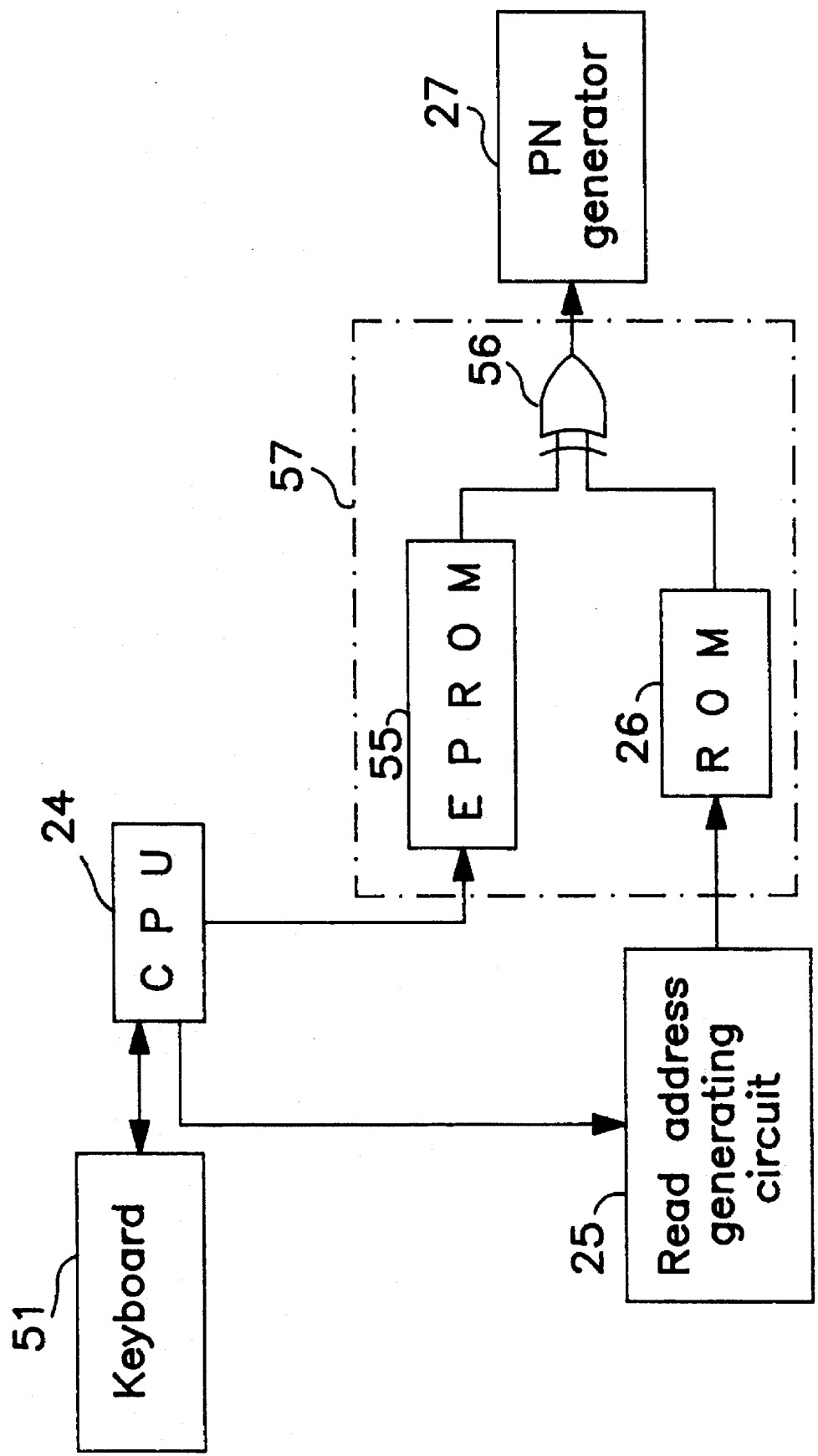
FIG. 10 is a block diagram showing a fourth exemplary embodiment of the present invention.
Figure 11:
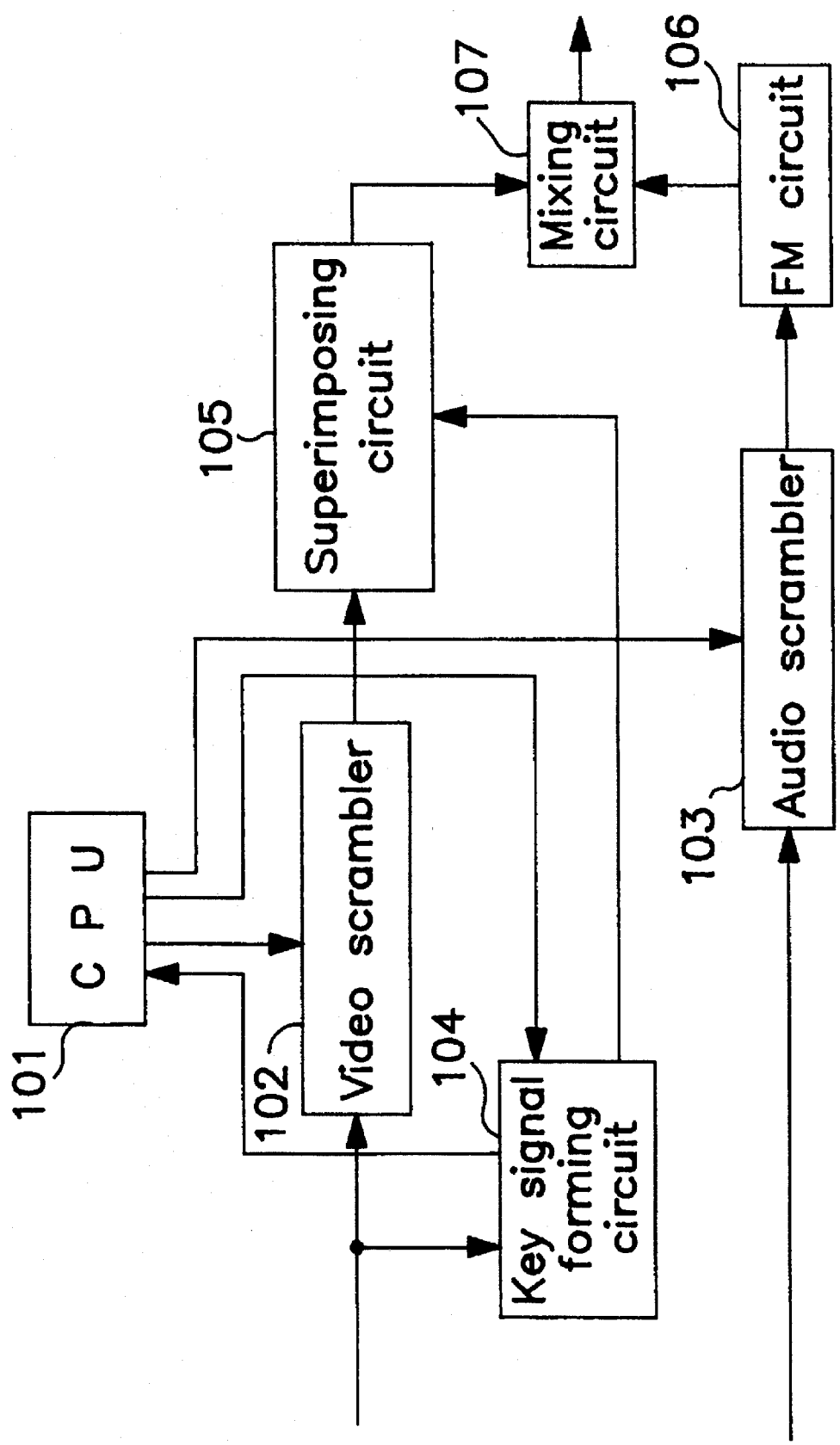
FIG. 11 is a block diagram showing the construction of a conventional scrambling apparatus.

A fourth exemplary embodiment is described while reference to FIG. 10. In this embodiment, the units which are different from those shown in the first exemplary embodiment are explained. In this embodiment, instead of using switches 18 (15 to 17), a keyboard 51 to provided so that a four-digit code number may be entered in CPU 24 through keyboard 51. CPU holds the four-digit code number as a 16-bit binary signal in, for example, a second memory 55 composed of an EPROM. As in the first exemplary embodiment, a read address generating circuit 25 is provided, and key data is read out from the 64-bit first memory (ROM) 26 through the read address generating circuit. In this case, the data is read out in a prescribed procedure so that four bits of the memory 26 may be assigned for one bit of the memory 55. The outputs of the memories 26 and 55 are provided to an EOR circuit 56. The EOR circuit 56 is a logic circuit which calculates an exclusive OR of the input signal, and which applies 16-bit data to the PN generator 27. In this embodiment, memories 26, 55 and EOR circuit 56 are contained in one package 57 which is detachable from casing 11. In this case, as compared with the first embodiment, the prevention of illegal deciphering may be enhanced. The logic circuit is not limited to an EOR circuit. Circuits such as an AND circuit and a NOR circuit may be used.

In the foregoing embodiments, video signals for horizontal scanning lines are alternately written into the line memories 35, 36 directly. The reading start position of each line memory is read out from a different position in each line by the address setting circuit 29 and read address counter 32 so as to perform an encrypting process. However, it is also possible to write from the address set in the address setting circuit when writing, and readout continuously from 0 to 744 bits in the read address counter. This is accomplished by exchanging the write address counter 31 and read address counter 32.

By employing the encrypting processing apparatus of the invention as described in the exemplary embodiments herein, scrambling and descrambling of video signal may be realized by the same apparatus. The circuit construction is relatively simple, and an expensive video signal encrypting apparatus is realized. By using a key data memory, for example, a key data K1 of up to 64 bits, the probability of realizing the same key is 1 out of 18,440,000,000 billion. Thus, the probability of producing the same key is very small.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claimed:

1. An apparatus for scrambling and descrambling a video signal which includes a plurality of horizontal scanning lines, comprising:

memory means for storing key data, a plurality of line memories, each for storing respective ones of said plurality of horizontal scanning lines, a PN generator, initialized by said key data stored in said memory means, for generating a respective pseudo-random pulse signal for each one of said plurality of horizontal scanning lines, address setting means for scrambling and descrambling, said address setting means set to an initial value corresponding to an output of the PN generator during scrambling, and, set to a further initial value which corresponds to a maximum address value of the plurality of line memories minus a further output of the PN generator during descrambling, and an address counter for generating a plurality of consecutive address values beginning at one of said initial value and said further initial value, and for applying each one of said plurality of consecutive address values respectively to each one of said plurality of line memories for each horizontal scanning line.

2. An apparatus according to claim 1, wherein the memory means includes a nonvolatile memory.

3. An apparatus according to claim 2, wherein the memory means includes a detachable memory device.

4. An apparatus according to claim 1, wherein the memory means includes a reloadable memory, and said memory means further includes input means for entering said key data.

5. An apparatus according to claim 1, wherein the memory means includes a detachable memory device.

6. An apparatus according to claim 1, wherein the PN generator includes one of a linear feedback shift register and a nonlinear feedback shift register.

7. An apparatus for scrambling and descrambling a video signal which includes a plurality of horizontal scanning lines, comprising:

memory means for storing key data for encrypting, a plurality of line memories, each for storing respective ones of said plurality of horizontal scanning lines, a PN generator, initialized by said key data stored in said memory means, for generating a respective pseudo-random pulse signal for each one of said plurality of horizontal scanning lines, address setting means for scrambling and descrambling, said address setting means set to an initial value corresponding to a maximum address value of the plurality of line memories minus an output of the PN generator during scrambling, and set to a further initial value which corresponds to a further output of the PN generator during descrambling, and an address counter for generating a plurality of consecutive address values beginning at one of said initial value and said further initial value, and for applying each one of said plurality of consecutive address values respectively to each one of said plurality of line memories for each horizontal scanning line.

8. An apparatus according to claim 7, wherein the memory means includes a nonvolatile memory.

9. An apparatus according to claim 8, wherein the memory means includes a detachable memory device.

10. An apparatus according to claim 7, wherein the memory means includes a reloadable memory, and said memory means further includes input means for entering said key data.

11. An apparatus according to claim 7, wherein the memory means includes a detachable memory device.

12. An apparatus according to claim 7, wherein the PN generator includes one of a linear feedback shift register and a nonlinear feedback shift register.

13. An apparatus according to claim 12, wherein said one of said linear feedback shift register and said nonlinear feedback shift register is a field programmable register.

14. An apparatus for scrambling and descrambling a video signal including a plurality of horizontal scanning lines, comprising:

a first memory for storing key data, a second memory for storing a reloadable code number which includes a plurality of digits, a plurality of line memories, each for storing respective ones of said plurality of horizontal scanning lines, a PN generator, initialized by said key data stored in said first memory and said reloadable code number stored in said second memory, for generating a respective pseudo-random pulse signal for each one of said plurality of horizontal scanning lines, an address setting circuit for scrambling and descrambling, said address setting circuit set to an initial value corresponding to an output of the PN generator during scrambling, and set to a further initial value which corresponds to a maximum address value of the plurality of line memories minus a further output of the PN generator during descrambling, and an address counter for generating a plurality of consecutive address values beginning at one of said initial value and said further initial value, and for applying each one of said plurality of consecutive address values respectively to each one of said plurality of line memories for each horizontal scanning line.

15. An apparatus according to claim 14, wherein the first memory and the second memory are included in a single detachable package.

16. An apparatus according to claim 14, wherein the PN generator includes one of linear feedback shift register and nonlinear feedback shift register.

17. An apparatus for scrambling and descrambling a video signal including a plurality of horizontal scanning lines, comprising:

a first memory for storing key data, a second memory for storing a reloadable code number which includes a plurality of digits, a plurality of line memories, each for storing respective ones of said plurality of horizontal scanning lines, a PN generator, initialized by said key data stored in said first memory and said reloadable code number stored in said second memory, for generating a respective pseudo-random pulse signal for each one of said plurality of horizontal scanning lines, an address setting circuit for scrambling and descrambling, said address setting circuit set to an initial value corresponding to a maximum address value of the plurality of line memories minus an output of the PN generator during scrambling, and set to a further initial value which corresponds to a further output of the PN generator during descrambling, and an address counter for generating a plurality of consecutive address values beginning at one of said initial value and said further initial value, and for applying each one of said plurality of consecutive address values respectively to each one of said plurality of line memories for each horizontal scanning line.

18. An apparatus according to claim 17, wherein the first memory and the second memory are includes in a single detachable package.

19. An apparatus according to claims 17, wherein the PN generator includes one of linear feedback shift register and nonlinear feedback shift register.

20. An apparatus according to claim 19, wherein said one of said linear feedback shift register and said nonlinear feedback shift register is a field programmable register.

21. An apparatus according to claims 1, 7, 14 or 17, wherein the address counter is a read address counter which generates a read address consecutively from the address set by the address setting circuit, and which applies respective read address signals to the plurality of line memories corresponding to said plurality of horizontal scanning lines.

22. An apparatus according to claims 1, 7, 14 or 17, wherein the address counter is a read address counter which generates a read address consecutively from the address set by the address setting circuit, and which applies respective read address signals to the plurality of line memories corresponding to said plurality of horizontal scanning lines.

23. An apparatus according to claims 1, 7, 14 or 17, wherein the address counter is a write address counter which generates a write address consecutive from the address set by the address setting circuit, and applies write address signals alternately to the pair of line memories in horizontal scanning line unit.

* * * * *

UNITED STATES PATENT AND TRADEMARK OFFICE
CERTIFICATE OF CORRECTION

PATENT NO. : 5,488,658
DATED : January 30, 1996
INVENTOR(S) : Hirashima

It is certified that error appears in the above-indentified patent and that said Letters Patent is hereby corrected as shown below:

Column 12, line 36, "includes" should be --included--.

Signed and Sealed this

Second Day of July, 1996

Attest:

BRUCE LEHMAN

Attesting Officer

Commissioner of Patents and Trademarks